Sept. 24, 1968  T. W. CHASE ET AL  3,402,572

ELECTRICALLY INSULATED MECHANICAL CONNECTOR

Filed Dec. 22, 1966

INVENTORS
THEODORE W. CHASE &
FRANK L. PTAK

Boyce C. Went
Their Attorney

United States Patent Office

3,402,572
Patented Sept. 24, 1968

3,402,572
ELECTRICALLY INSULATED MECHANICAL CONNECTOR
Theodore W. Chase and Frank L. Ptak, Baltimore, Md., assignors to Koppers Company, Inc., a corporation of Delaware
Filed Dec. 22, 1966, Ser. No. 603,809
4 Claims. (Cl. 64—6)

ABSTRACT OF THE DISCLOSURE

A mechanical connector for transmitting power from a driving to a driven member, for example, a gear-type flexible shaft coupling, having an electrical insulating and adhesive material in the connection between the driving and driven members to connect these members yet to prevent the flow of electricity between these members.

Background of the invention

*Field of the invention.*—This invention relates generally to electrical insulation means for power transmission devices and more particularly to means for electrically insulating the driving from the driven members of flexible shaft couplings for the transmission of torque.

*Description of the prior art.*—Heretofore couplings which will electrically insulate the driving from the driven members have been of two general types. One type has one of the members, either the driving or driven member, made from a dielectric material. The disadvantages of this type are that dielectric materials are likely to be expensive, and most dielectric materials do not possess the load carrying capability of metals. The second type uses an insulation, such as rubber, between the bolts connectig the driving and driven members together. As an example, a phenolic disc has been placed between the sleeve halves at the joining of the flange portions, phenolic or rubber bushings have been placed around the bolts that join the flanges, and phenolic washers have been placed under the bolt head and under the nut. A disadvantage of this latter type of coupling is its expense. Several additional parts are required which are, in themselves, expensive as well as requiring more assembly time. Also, phenolic parts are usually brittle and are subject to breakage. Generally, it can be said that the noon-metallic parts reduce the load-carrying capacity of the coupling. If rubber insulating elements are used, some undesirable torsional resilience usually results.

Summary of the invention

The present invention provides a torsionally rigid means for electrically insulating the driving and driven members of a mechanical connector while maintaining its load-carrying capacity by dividing the driving or driven member into two components and rigidly connecting these parts by a thin, strong barrier or dielectric adhesive material, preferably an epoxy resin. The dielectric material provides an effective barrier against the flow of electricity between the components yet joins the components for rigid torsional rotation. Thus, electrical insulation is accomplished without the heretofore need for additional parts such as bushings, washers, and the like or the need for making an entire component from dielectric material.

While the preferred embodiment illustrates the invention as a gear-type flexible shaft coupling, it should be understood that the invention is equally applicable to other power transmission devices such as universal joints, chain sprockets, gears, pulleys, sheaves, rigid shaft and pipe couplings and the like.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Brief description of the drawings

In the drawings wherein like parts are marked alike.

Description of the preferred embodiments

Figure 1:
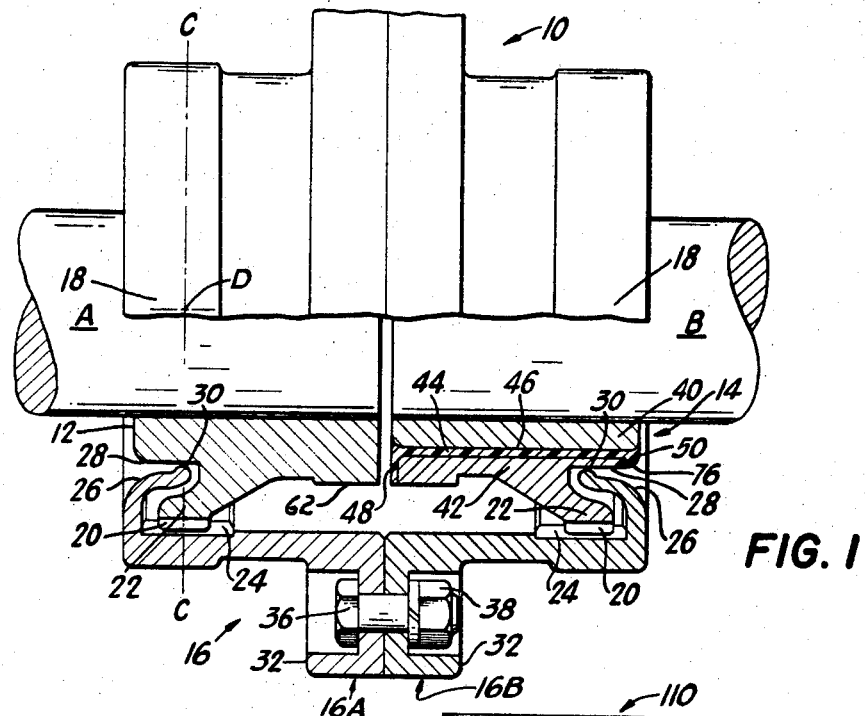
FIGURE 1 is a radial view in partial cross-section of a gear-type flexible shaft cupling showing the insulation barrier applied between two components of the hub portion of the coupling.

An embodiment of the invention is illustrated in FIG. 1 as a gear-type flexible coupling 10 for transmitting power between drive shaft A and driven shaft B. A driving hub 12 is mounted on shaft A; a driven hub 14 is mounted on shaft B; and both hubs 12 and 14 are surrounded by a sleeve through which torque is transmitted from one hub to the other. Hubs 12 and 14 are press fitted to the shafts and are locked by keys 18 to the respective shafts.

External spur gear teeth 20 formed on a flange 22 of each hub mesh with internal spur gear teeth 24 formed on the inner periphery of both ends of sleeve 16. The axial length of internal teeth 24 is greater than the axial length of external teeth 20 so that the mating teeth will remain engaged even though slight shaft separation may occur in the axial direction.

End rings 26 are formed on the ends of sleeve 16 to retain lubrican within the coupling and to exclude contaminants. As shown in FIG. 1, these end rings are turned in axially to nearly contact sealing shoulder 28 on the hubs along a plane C—C perpendicular to the hinge point D. As angular misalignment occurs, the hubs pivot slightly about hinge point D; thus, the smallest amount of radial separation between flange 26 and shoulder 28 occurs along plane C—C. The inner radius 30 of flange 26 is spherical so as to roll around shoulder 28 when contact occurs due to angular misalignment; without misalignment, there is a slight clearance between flange 26 and shoulder 28. At rest, the lubricant level is below radius 30 so that no leakage occurs; and during rotation, centrifugal force keeps the lubricant outward of radius 30 so that no leakage occurs. Lubricant is added to the coupling through a conventional lubricant hole (not shown).

Because of end rings 26, sleeve 16 is made in identical halves, 16A and 16B, so that the coupling can be assembled. Flanges 32 are provided at the center of the coupling and are joined by bolts 36 and nuts 38.

Hub 14 is divided into inner bushing portion 40 and outer hub portion 42. The outer diameter of bushing 40 is smaller than the inner diameter of outer hub portion 42 to provide an annular space 44 therebetween for an insulating and adhesive material 46. Preferably, the axial length of the inner diameter of outer hub portion 42 is shorter than the length of the outer diameter of bushing 40 to permit the formation of radial beads 48 and 50 of the insulating and adhesive material flush with the ends of bushing 40 to retard arc-over or creeping of current between the ends of bushing 40 and hub portion 42.

The insulating and adhesive material 46 provides an electrical insulating barrier against the flow of current between bushing 40 and hub portion 42. Thus the flow path of any current between shafts A and B is obstructed by the material 46. In addition, material 46 bonds the bushing 40 to hub portion 42 for rotation together. While the primary desirable properties of material 46 are high dielectric constant and high shear strength in bond, the insulating material 46 should also be in the nature of an adhesive.

Epoxy resins possess good adhesive and dielectric properties for use as the material 46. These resins are condensation products of polyhydric components such as polyhydric alcohols or phenols and epichlorohydrin. Typical epoxy resins are sold under the names Epon, Araldite, Epi-Rez. The epoxy resins are cured with a cross-linking agent such, for example, as a dibasic anhydride, for example, phthalic anhydride. Curing begins at an accelerated rate when the epoxy resin and curing agent are heated at an elevated temperature and the cured resin adheres firmly to the surface with which it is in contact. No volatile substances are given off either by the heating or by the curing, so the volume undergoes practically no change.

Several materials are commercially available with these properties for use as material 46. A particularly satisfactory material is an epoxy resin adhesive sold under the name Scotchweld EC–1386. This material has a dielectric constant which varies with temperature from 5.11 at 23° C. to 8.37 at 135° C. as measured according to ASTM specification D–150. Its dielectric strength varies with the thickness of the film. As an example, a ⅛ inch thick film cured for one hour at 350° F. had a dielectric strength of 400+ volts per minute as measured by ASTM specification D–149, and when bonded to bushing 40 and hub portion 42, the material had a shear strength of 4600 p.s.i. at a continuous operating temperature of 180° F. A laboratory model of coupling 10 was tested at 3½ times the rated torque load for the coupling. Under this load, the shafts A and B twisted and key 18 was damaged but the insulating material 46 remained in satisfactory condition.

The size of annular space 44 can be varied but preferably is kept as thin as possible so as not to adversely affect the shear strength of insulating material 46. Of course, the thinner the film or barrier, the less resistance to the flow of electricity. In practice, it has been found that a space of 0.040" is optimum from the standpoint of shear strength and resistance to electrical flow for shaft sizes up to about 3⁵⁄₁₆ inches, a space of 0.045 inch is best for shaft sizes up to about 6⅛ inches; and a space of 0.050 inch is best for sizes larger than 6⅛ inches. However, the increase in size of space 44 is for assembly purposes rather than for shear strength or dielectric strength.

Figure 3:
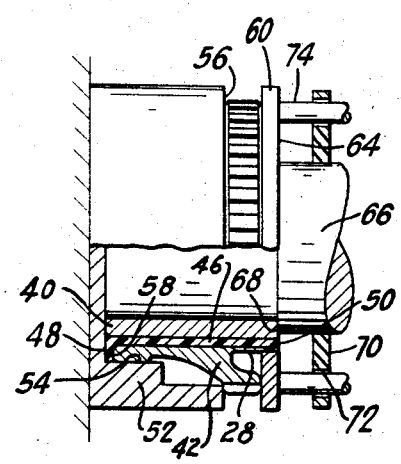
FIGURE 3 is a radial view in cross-section showing a coupling hub in a fixture that may be used to apply the insulating barrier.

A convenient apparatus for use in bonding bushing 40 to hub portion 42 with the insulating material 46 is shown in FIG. 3. A female die 52 is provided with an inner diameter 54 to snugly receive inner shoulder 62 therein and a top shoulder 56 to support teeth 20 of hub 42 so that surface 58 of hub 42 does not touch the bottom of die 52. Thus a space is formed into which the insulating material 46 forms radial bead 48. An auxiliary female fixture 60 is provided with an inner diameter to fit surface 28 of hub 42. Fixture 60 rests on top of teeth 20 and has a thickness at least thick enough to place its surface 64 even with the end of bushing 40 after insertion in hub 42. This provides a space into which the insulating material 46 can flow to form radial bead 50.

A male die 66 has a diameter to snugly receive bushing 40 and a shoulder 68 to position the ends of the bushing 40 and die 66 flush with each other. A radial flange 70 is provided on male die 66 with a number of holes 72 therein for receiving pins 74 formed on auxiliary fixture 60 for centering bushing 40 within hub 42.

In using this apparatus, a quantity of liquid insulating material 46 is poured into the bottom of the mold formed by hub 42 and female die 52, and the assembly of bushing 40 and male die 66 is pushed into the mold. This forces the insulating material 46 upward into the space 44 between the bushing and the hub until the end of male die 66 is seated against female die 52. A slight turning of male die 66 with the bushing 40 will act to evenly distribute the insulating material 46 without cavities or air bubbles. The assembled parts are then heated for about one hour at 350° F. to cure the material 46. Thereafter, the fixture is removed from the completed hub 14. The fixture components are preferably made from or coated with polytetrafluoroethylene to prevent the insulating adhesive material 46 from sticking to them.

The hub 14 may then have radius 76 ground on the insulating material 46, and any mold flash trimmed. At this stage, the keyway for key 18 has not been formed in bushing 40; usually, the finished part is stocked and is rebored and the keyway cut upon receipt of an order.

Figure 2:
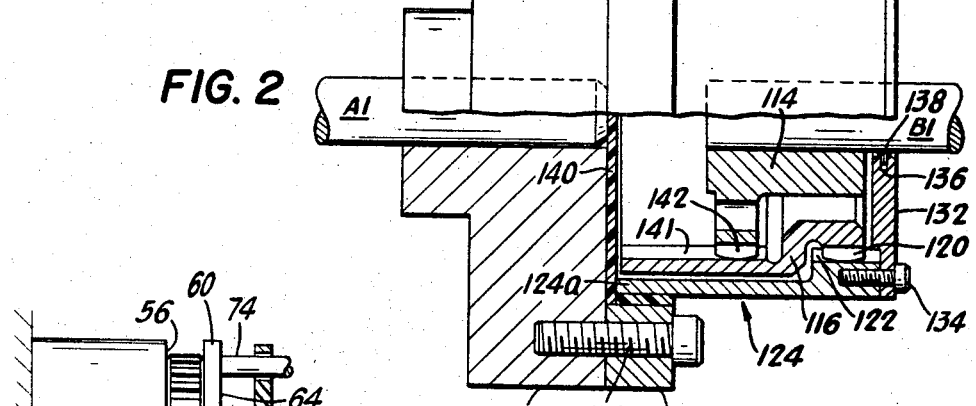
FIGURE 2 is a similar view showing the insulation barrier applied between two components of the sleeve portion of coupling.

FIG. 2 illustrates another embodiment of flexible gear coupling 110 for connecting shafts A1 and B1. Inner sleeve 116 has external crowned teeth 120 for meshing engagement with the internal teeth 122 of outer sleeve 124. Bolts 130 pass through flange 126 of sleeve 124 and thread into hub 128 to secure sleeve 124 to hub 128.

Secured to sleeve 124 by screw 134 is an end ring 132 that has an inner groove 136 for retaining a metal seal ring 138 as described in Carman application Ser. No. 486,945, now Patent No. 3,343,376. Seal ring 138 retains lubricant within the coupling and excludes contaminants.

Coupling 110 operates much like coupling 10 except that greater axial misalignment is possible by forming internal teeth 141 on sleeve 116 much longer than male teeth 142 on hub 114. This permits shaft B1 to extend axially for a considerable distance because of, for example, expansion due to heat. Coupling 110 illustrates that the insulating and adhesive material can also be located in the sleeve portion of a coupling. As shown, sleeve 124 is divided into two components, flange portion 126 and sleeve portion 124a. The inner diameter of flange portion 126 is larger than the outer diameter of sleeve portion 124a to provide an annulus which is filled with a dielectric adhesive material.

Since hub 114 may extend as far as hub 128, a phenolic or plastic disc 140 is preferably positioned between sleeve 124 and hub 128 to prevent the flow of current between these two parts should they contact each other.

It should be understood that for the embodiment described, it is usually not necessary to insulate against continuous high voltages, but only against transient low voltages. Otherwise, provision must be made to prevent conduction of electricity through the lubricant in the coupling, which lubricant is usually a poor conductor. In the event such insulation is required, a phenolic or like disc can be provided between the coupling hubs 12 and 14 which would divide the lubricant reservoir. Another alternative would be to lubricate the coupling with a non-conducting lubricant such as conventionally used in high power electrical transformers.

Having thus described our invention in its best embodiment and mode of operation, what we desire to claim by Letters Patent is:

1. An electrically insulated mechanical connector for connecting driving and driven elements, comprising:
   a first bushing member connected for rotation with said driving element;
   a second hub member connected for rotations with said driven element, said hub member overlying said bushing member and defining an annular space therebetween; and
   a dielectric adhesive material filling said annular space to rigidly join said bushing member for rotation with said hub member and to electrically isolate said members;
   said dielectric adhesive material including beads of said material adjacent the end portions of said members for retarding the flow of electricity therebetween.

2. The mechanical connector of claim 1 wherein the radial dimension of said annular space is between 0.040 inch and 0.050 inch.

3. The mechanical connector of claim 1 wherein the axial length of said second member overlying said first member is less than the axial length of said first member defining radial spaces overlying the ends of said second member; and said dielectric adhesive in said annular space extends into said radial spaces to form beads of dielectric adhesive on the ends of said second member.

4. The coupling of claim 1 wherein said dielectric adhesive material is an epoxy resin.

References Cited

UNITED STATES PATENTS

| | | | |
|---|---|---|---|
| 1,639,240 | 8/1927 | Van Leir | 64—9 |
| 1,666,445 | 4/1928 | Fast | 64—9 |
| 1,983,007 | 12/1934 | Simons | 64—11 |
| 2,558,589 | 6/1951 | Skolfield | 64—27 X |
| 2,620,639 | 12/1952 | Burawoy | 64—11 |
| 2,906,107 | 9/1959 | Sylvester | 64—27 |

HALL C. COE, *Primary Examiner.*